United States Patent
Salisbury et al.

(10) Patent No.: US 11,595,715 B2
(45) Date of Patent: Feb. 28, 2023

(54) RECENT CHANNELS PRE-CALCULATION IN VIDEO DELIVERY

(71) Applicant: HULU, LLC, Santa Monica, CA (US)

(72) Inventors: Mckay Salisbury, Culver City, CA (US); Peter Moore, Encino, CA (US); Karthik Prasanna, Los Angeles, CA (US); Xiaoming Sun, Los Angeles, CA (US); Tong Yang, Los Angeles, CA (US); Srivardhan Jalan, San Francisco, CA (US); Arkin Yetis, Thousand Oaks, CA (US)

(73) Assignee: HULU, LLC, Santa Monica, CA (US)

( * ) Notice: Subject to any disclaimer, the term of this patent is extended or adjusted under 35 U.S.C. 154(b) by 39 days.

(21) Appl. No.: 16/860,681

(22) Filed: Apr. 28, 2020

(65) Prior Publication Data
US 2021/0337256 A1 Oct. 28, 2021

(51) Int. Cl.
*H04N 21/266* (2011.01)
*H04N 21/2668* (2011.01)

(52) U.S. Cl.
CPC ... *H04N 21/26613* (2013.01); *H04N 21/2668* (2013.01); *H04N 21/26603* (2013.01); *H04N 21/26606* (2013.01)

(58) Field of Classification Search
CPC ....... H04N 21/26613; H04N 21/26603; H04N 21/26606; H04N 21/2668
USPC .......................................................... 725/25
See application file for complete search history.

(56) References Cited

U.S. PATENT DOCUMENTS

| 8,949,873 | B1* | 2/2015 | Bayer | H04N 21/44222 725/14 |
|---|---|---|---|---|
| 2007/0266403 | A1* | 11/2007 | Ou | H04N 21/4432 725/35 |
| 2008/0018805 | A1* | 1/2008 | Han | H04N 21/4345 348/732 |
| 2009/0204899 | A1* | 8/2009 | Bennett | H04M 1/72572 715/730 |
| 2012/0254910 | A1* | 10/2012 | Donoghue | H04N 21/26258 725/14 |
| 2012/0290831 | A1* | 11/2012 | Magis | H04N 21/63345 713/150 |
| 2014/0075464 | A1* | 3/2014 | McCrea | G16H 40/67 725/14 |
| 2017/0094349 | A1* | 3/2017 | Maughan | H04N 21/44226 |

* cited by examiner

*Primary Examiner* — Nasser M Goodarzi
*Assistant Examiner* — Jaycee Imperial
(74) *Attorney, Agent, or Firm* — Kwan & Olynick LLP (57) ABSTRACT

In some embodiments, a method receives a message that identifies an asset being viewed on a video service at a timestamp. The message is associated with a profile identifier and a plurality of messages are received for the profile identifier while using the video service. The method determines a channel identifier for a channel in which the asset is offered during the timestamp and determines whether a channel change occurred based on the channel identifier and a prior channel identifier determined from a prior message in the plurality of messages. When the channel change has occurred, the method stores the channel identifier and timestamp for the profile identifier in a data structure, wherein a list of channels is generated by querying the data structure to determine a set of channel identifiers and timestamps for the profile identifier.

22 Claims, 9 Drawing Sheets

//' RECENT CHANNELS PRE-CALCULATION IN VIDEO DELIVERY

BACKGROUND

When using a live television (TV) service, the user may watch different live TV channels. For example, the user may typically watch a Channel X and a Channel Y because the user's favorite shows are on those channels. To navigate to those channels, the user can type the identifier for the TV channel into a remote control and navigate to that channel directly. However, typing in the identifier for the channel may be inconvenient for the user. Also, the TV service may provide an electronic program guide (EPG) that lists all the live TV channels that are available on the service. The user may page through the channels to find the TV channels the user typically watches. Paging through a large number of TV channels on the EPG may also be inconvenient for the user and time-consuming if many pages of the EPG need to be paged through to get to the user's desired channel.

BRIEF DESCRIPTION OF THE DRAWINGS

With respect to the discussion to follow and in particular to the drawings, it is stressed that the particular implementation details represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments calculate a list of channels for users of a service. For example, the most recent channels viewed by a user of a video delivery service is generated. A system may receive periodic messages, such as beacons, that include information about a status of a profile, such as an asset that the profile is currently watching. The profile may be associated with a user of the service. The asset may be a program or video that is currently playing on a channel.

The system may check to see if the profile has changed to a different channel since the last message that was received. If no channel change has occurred, the system may not perform an action as the profile has not changed to a different channel since the last message was received. For example, the system may not save information for the message. However, if the profile has changed to a different channel and is watching a different asset, the system saves information for the new channel in a recent channels database that stores information for the recent channels the profile has watched. In storing the information for the recent channel in the recent channels database, the system performs a pre-calculation that enhances the future re-access of the recent channels database. For example, the system may pre-calculate the channel in which the asset is being offered at the time that is received in the message. Also, the system may store the information for the recent channel in a way that reduces the processing required when the system generates the most recent channel list for a user.

Previously, a database may have stored information for every single message that is received for a profile. For example, the database may store the asset identifier (ID) found in every message. This would result in multiple entries for a profile viewing the same asset because the messages may be received at intervals even if channel changes did not occur. Each message indicates the current channel the profile is watching even if the channel is the same and has not changed. Additionally, the asset is listed in the database. In some embodiments, the asset is received in the message because the system is offering a video on demand service and a live television service. The messages indicate the asset that the profile is watching because the on-demand service is not associated with a channel. When a most recent channel list is generated, the system would have queried for the entire list. However, the list may be too large to retrieve in one query. Thus, the system queries for batches of the list and processes the batches in series. The processing may involve determining the asset and the time of viewing and then determining the channel in which the asset was being offered on at the time. The system can then add the channel to the most recent channels the user has watched. The above process continues until the number of most recent channels is found and may require that the system process many batches of entries to finally generate the most recent channel list. This may be an inefficient and resource-comprehensive process as multiple requests may be made to the database, and also processing of the results may require further queries to determine the channel that was offering the asset at the time.

In some embodiments, the system may reduce the processing time when generating the channel list by performing a pre-calculation on the information in the messages before storing information for a recent channel in the recent channels database. For example, the system may pre-calculate the channel for an asset. This saves queries to determine a channel that was offering an asset at a time the message was received when the recent channel list is generated at a later time. Also, the system may ignore messages that are received when a user has not changed the channel from the prior message. This may reduce the number of entries in the recent channels database. Further, when information is stored in the recent channels database, the system stores the information in a way such that when the recent channels database is read to generate a recent channels list, the system may not need to process every channel that a user has viewed over a long time period.

System Overview

Figure 1:
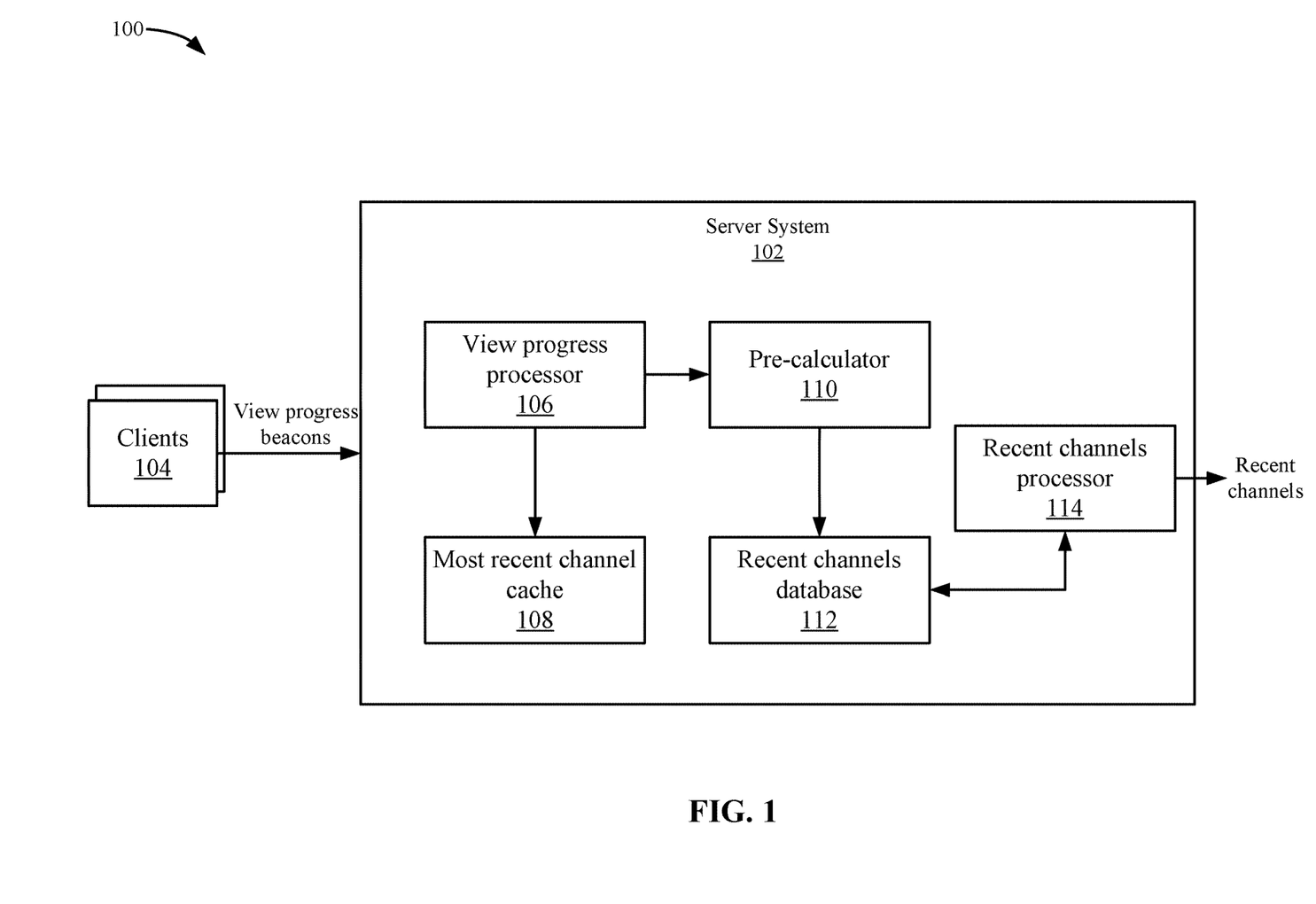
FIG. 1 depicts a simplified system for calculating a list of channels in a video delivery service according to some embodiments.

FIG. 1 depicts a simplified system 100 for calculating a list of channels in a video delivery service according to some embodiments. System 100 includes a server system 102 and clients 104. Server system 102 may include one or more computing systems that are providing services for the video delivery service, such as calculating lists of channels for profiles of users that are using clients 104. Although a recent channel or most recent channel list may be discussed, the list of channels may be based on a criterion that may or may not be based on recency, which may be the most recent channels used within a time period.

Clients 104 may be user devices that are being used by users to watch videos on a video delivery service. For example, a live TV service may offer various assets (e.g., programs of content) on the channels in a linear schedule. For example, a program may be offered at a certain time on a certain channel. A channel may be an entity on the live service, such as a TV channel, a network channel, a dynamically generated channel, any other logical organization of programs being offered on a linear schedule. Clients 104 may also be used to watch on demand videos, which may be streamed to clients 104 at any time in contrast to videos being offered on the live TV service only at certain times. In some embodiments, the video delivery service offers both the on-demand service and the live TV service. Also, the video delivery service uses profiles, which is an identification of a user entity that is using the video delivery service. For example, a user may create a profile, which is identified by a profile ID on the video delivery service. A user may also have one or more profiles.

Server system 102 includes a view progress processor 106, a most recent channel cache 108, a pre-calculator 110, a recent channels database 112, and a recent channels processor 114.

View progress processor 106 processes messages from clients 104, such as view progress beacons. A beacon may be a message that is sent periodically, such as at certain intervals from clients 104. The view progress beacons may include information about the status of clients 104, such as a playback status. The status may identify an asset that client 104 is currently playing (e.g., a profile ID, the asset being viewed, and a timestamp).

Most recent channel cache 108 may be a data structure that stores the most recent channel that a profile has watched. For example, profile IDs being used on the video delivery service may have an entry in most recent channel cache 108. Each entry may list the most recent channel that was watched by a profile ID. However, not all profile IDs may have an entry if the profile ID has not watched a channel recently, such as within a time threshold.

View progress processor 106 may determine when a profile ID has watched a new channel or changed to a different channel. When this occurs, pre-calculator 110 may use the information from the view progress beacon to store information for the new or different channel in recent channels database 112. For example, when no entry for the profile ID exists in recent channels database 112, view progress processor 106 stores a new entry for the profile ID with the new channel. When an entry for the profile ID exists in recent channels database 112, view progress processor 106 stores the different channel for the profile ID. The entry may include the channel and the time that the channel was viewed.

Pre-calculator 110 may pre-calculate the information that is stored in recent channels database 112. The pre-calculation may determine the channel, if any, that is associated with the asset. Also, the pre-calculation may include the method in which data is stored. Different pre-calculations will be described in more detail below. The pre-calculations may reduce the amount of processing needed to be performed by recent channels processor 114. For example, the pre-calculation may remove the need to send a query to determine a channel for an asset ID in a list of all assets that a profile ID has watched over a time period when calculating a list of channels.

Recent channels database 112 may be a data structure that stores channels that a profile ID has watched over a time period. The time period may be from the start of using the video delivery service or may be within a certain time period, such as a day, days, a week, a month, etc. The channels that are stored may be based on a criterion, such as recency (e.g., the last day, week, month, etc.). Although recency is described, other criterion may be used, such as a number of times that the channel is viewed over a time period.

In some embodiments, recent channels database 112 stores the data about the recent channels that were watched by the profile ID in a format that does not require a conversion from an asset to a channel. Further, the format may not require processing of a full list of assets the user has watched over a time period. In some embodiments, recent channels database 112 may store a combination of the profile ID, a timestamp, and a channel ID. The profile ID identifies a profile, the timestamp is a time associated with viewing the asset or a time the view progress beacon was sent or received, and the channel ID is the channel in which the asset was being played at the timestamp. The entries may be sorted by different keys, such as by recency or by channel.

Recent channels processor 114 may generate a list of channels for a profile ID. For example, recent channels processor 114 may receive a request for a list of channels and generate a query to recent channels database 112 for the request. The query may be based on a criterion in the request. In some embodiments, the request may be the most recent channels viewed by the profile ID in a time period. The criterion may be recency and the X most recent channels. Recent channels processor 114 receives information from recent channels database 112 and can generate the list of channels.

Instead of storing each asset that has been watched by a profile ID, storing the channel IDs with a timestamp and profile ID allows recent channels processor 114 to compute a list of recent channels more efficiently and faster. For example, recent channel processor 114 does not need to receive a list of assets, determine if the asset was on a channel, and add the channel ID for the channel to an internal list that is stored in memory. This process would have to continue with adding channel IDs to the internal list until the list of recent channels is determined. In some embodiments, recent channel processor 114 may perform a query to recent channels database 112 for the recent channels for a profile ID. Then, in contrast to conventional process, recent channels processor 114 may process the channel IDs to generate the most recent channel list. Processing the channel IDs instead of asset IDs improves the processing time to generate the list of recent channels by removing a look up for the channel ID at the time of the timestamp. Also, the amount of data that is read from recent channels database 112 may also be less. In some embodiments, a single request may be performed to recent channels database 112 because the amount of data stored for a profile ID that is used to generate a list of recent channels is much less due to information for every view progress beacon not being stored.

View Progress Beacon Processing

Figure 2:
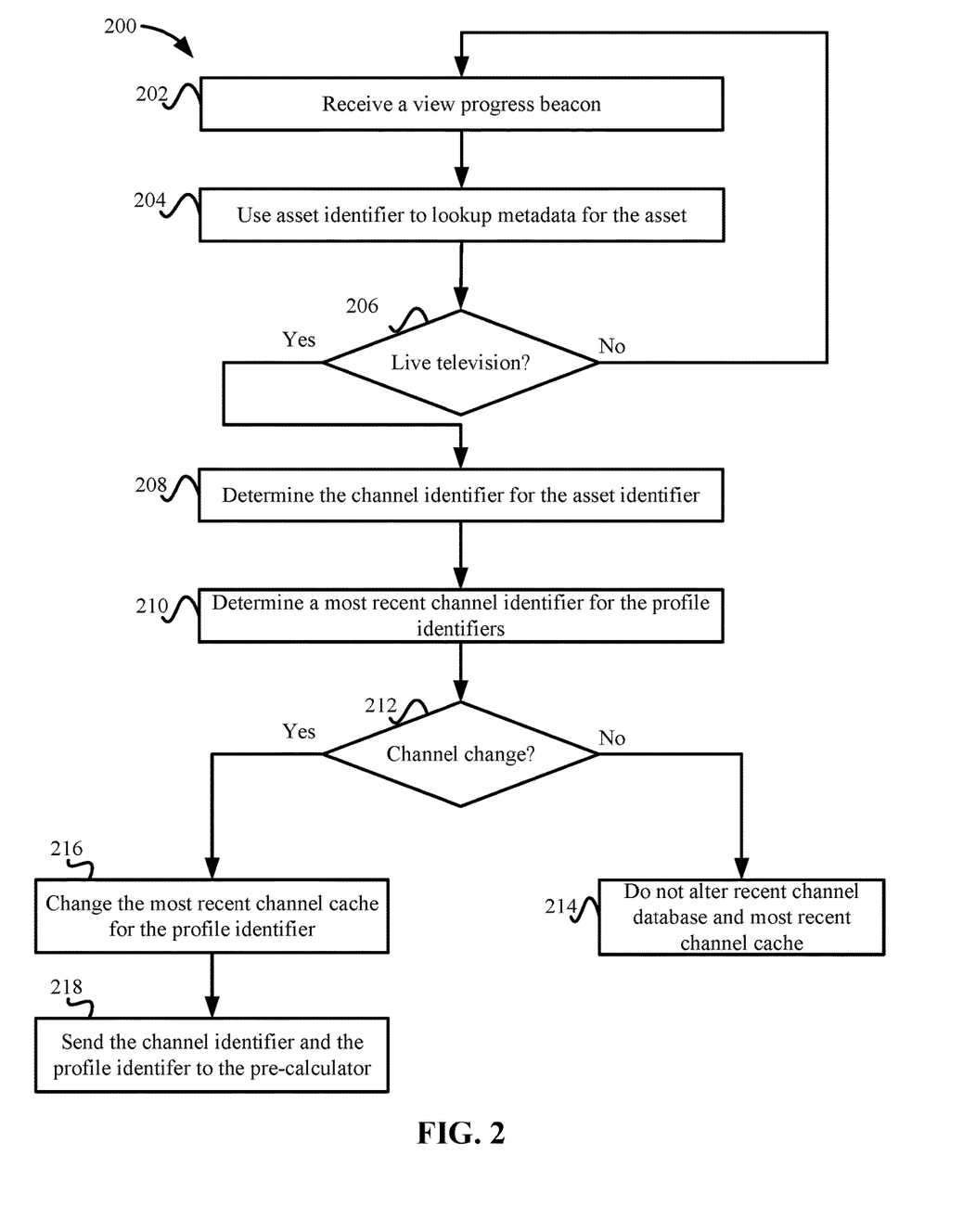
FIG. 2 depicts a simplified flowchart of a method for processing view progress beacons according to some embodiments.

FIG. 2 depicts a simplified flowchart 200 of a method for processing view progress beacons according to some embodiments. As mentioned above, the view progress beacons may be sent at intervals, such as pre-defined intervals, from clients 104 to server system 102. The view progress beacon may include an asset ID and be sent at times other than when a channel change occurs at client 104. For example, every X seconds, clients 104 may send a view progress beacon with an asset ID in which client 104 is playing back. In some embodiments, the view progress beacon may include a profile ID which identifies a profile on the video delivery service and an asset ID which identifies an asset on the video delivery service (e.g., a program). The asset may be a program that is being offered on a channel in a live TV service. Also, the asset ID may be for an asset that is offered on demand.

At 202, view progress processor 106 receives a view progress beacon. Beacons may be received from multiple clients 104. Server system 102 receives view progress beacons from clients 104 that indicate the current status of clients 104. For example, the beacons may list the profile ID that is being used by clients 104 to access the video delivery service. In some embodiments, a user may log in using a profile ID that has been created on the video delivery service.

At 204, view progress processor 106 uses the asset ID to look up metadata, such as whether the asset is a live TV asset of video on demand asset, and a channel ID for the asset if the asset is a live TV asset.

At 206, view progress processor 106 determines whether the asset being viewed is associated with a live television channel or is an on-demand asset. As discussed above, the profile ID may be viewing different types of videos on the video delivery service. If the asset being viewed is for the on-demand service, the process reiterates to 202 to wait to process other view progress beacons.

If the asset ID is associated with a live TV service, at 208, view progress processor 106 determines the channel ID for the asset ID. For example, the channel ID is the channel that is offering the asset at the time of the time stamp from the view progress beacon.

At 210, view progress processor 106 determines a most recent channel ID for the profile ID. For example, most recent channel cache 108 may store the most recent channel IDs for profile IDs. View progress processor 106 may send a query to most recent channel cache 108 to retrieve the most recent channel ID, if any, for the profile ID. Most recent channel cache 108 may receive the profile ID and look up whether the profile ID has a corresponding entry in most recent channel cache 108. If the profile ID has a corresponding entry, most recent channel cache 108 returns the most recent channel for that profile ID. If the profile ID does not have an entry in most recent channel cache 108, the most recent channel cache 108 may return nothing or may return a value that indicates the most recent channel is not stored in most recent channel cache 108 for the profile ID. In some embodiments, to reduce the size of the most recent channel cache 108, most recent channel cache 108 may remove entries after a certain time period. Removal of the entries may be after the profile ID logs off the service, after a time period of inactivity, after a set time period, etc. The objective is to determine when client 104 continues to watch the same channel or when client 104 changes to watch a new channel. Most recent channel cache 108 may not need to keep the most recent channel for a profile ID after a certain time in most cases. For example, after the user stops watching the service or after a pause in watching the service, the next time the profile ID uses the service, view progress processor 106 stores the new channel ID as the most recent channel in most recent channel cache 108.

Then, at 212, view progress processor 106 determines if a channel change has occurred. If a channel change has not occurred, at 214, server system 102 may not alter recent channels database 112 because the channel has not changed. Server system 102 may also not alter most recent channel cache 108 because the channel has not changed. The above avoids multiple write commands as recent channels database 112 does not need to be altered for this view progress beacon because the most recent channel has not changed.

If a channel change has occurred, at 216, view progress processor 106 changes most recent channel cache 108 to add the most recent channel to an entry for the profile ID. In some embodiments, view progress processor 106 may overwrite the entry for the profile ID in most recent channel cache 108.

Then at 218, view progress processor 106 sends the channel ID and the profile ID to pre-calculator 110. Pre-calculator 110 may then alter recent channels database 112, which will be described in more detail.

Pre-Calculator

Figure 3:
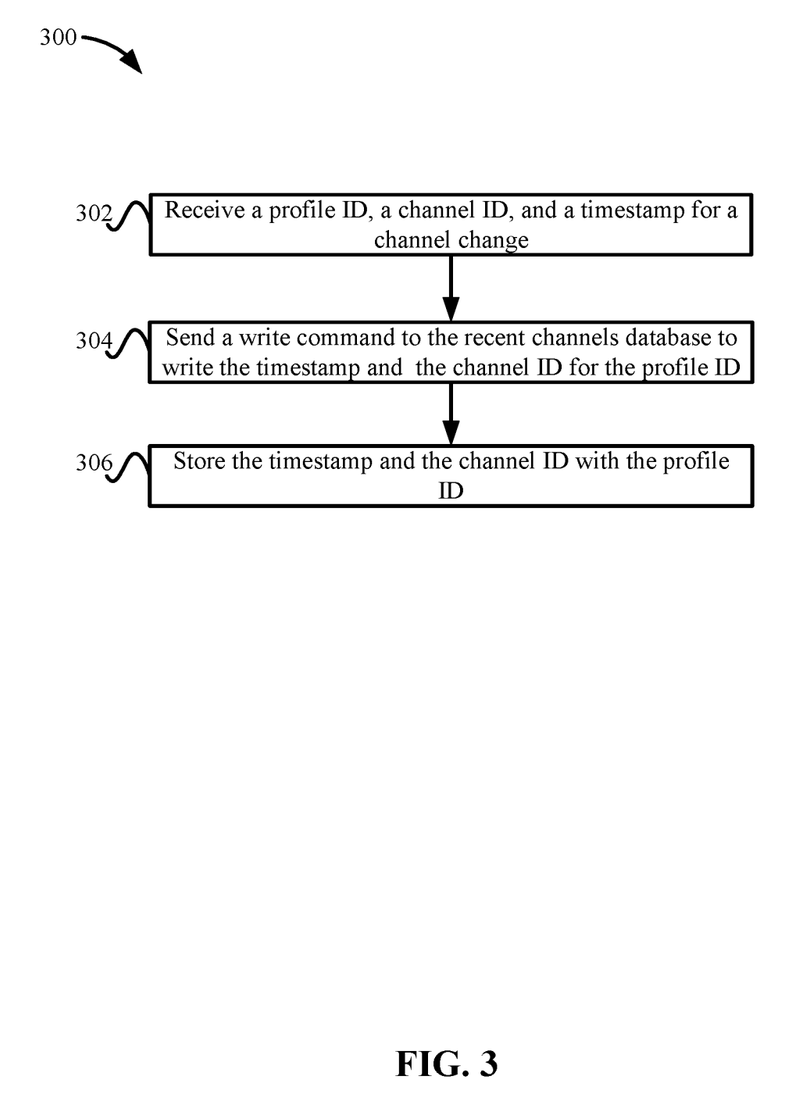
FIG. 3 depicts a general method for storing information for a channel change in a recent channels database according to some embodiments.

Different methods may be used to store information for the channel change in recent channels database 112. FIG. 3 depicts a general method for storing information for a channel change in recent channels database 112 according to some embodiments. As discussed above, pre-calculator 110 stores information for the channel change in recent channels database 112 instead of information for an asset. By storing information for the channel ID, such as storing a channel ID and timestamp for the profile ID, when a query is performed to determine a list of recent channels, recent channels processor 114 does not need to determine what channels on which an asset was being played at a particular point in time. That is, recent channels processor 114 does not receive asset IDs and timestamps and have to perform queries to determine if the asset IDs were offered on a channel at those particular times.

In the process, at 302, pre-calculator 110 receives a profile ID, a channel ID, and a timestamp for a channel change. Pre-calculator 110 may only receive a message for a channel change when view progress processor 106 determines if a view progress beacon includes information for a channel change. At 304, pre-calculator 110 sends a write command to recent channels database 112 to write the timestamp and the channel ID for the profile. As will be described in more detail below, pre-calculator 110 may use different formats to store an entry in recent channels database 112.

At 306, recent channels database 112 stores the timestamp and the channel ID with the profile ID. Accordingly, recent channels database 112 stores entries that include the most recent channel ID and the timestamp in which the channel change occurred. Pre-calculation of whether the channel change has occurred and the channel ID for the asset may allow more efficient querying to generate a list of recent channels as will be described in more detail below. Pre-calculator 110 may store entries in recent channels database 112 using different methods. In some embodiments, recent channels database 112 may store entries based on a shard key, a sort key, and other data. The shard key may be an index field that exists in every document and divides the documents into chunks with similar shard keys. For example, the shard key may be the profile ID such that entries in recent channels database 112 can be divided by profile ID. The sort key may be a key that is used to sort entries, which may be a timestamp or a channel ID from the entry. When the sort key is the timestamp, the other data may be the channel ID. Also, when the sort key is the channel ID, the other data may be the timestamp. Using different sort keys results in different read and write operations as will be described below.

Using Channel ID as the Sort Key

Figure 4:
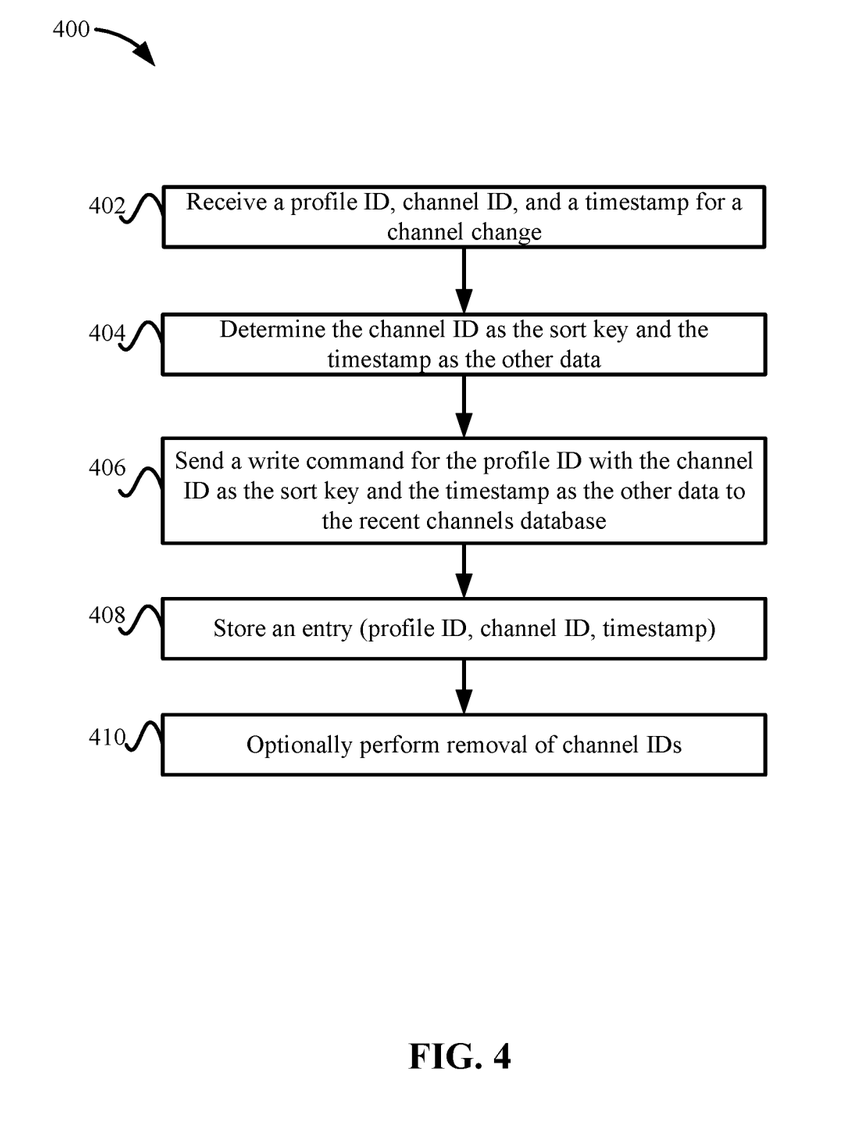
FIG. 4 depicts a simplified flowchart of a method for using the channel ID as the sort key according to some embodiments.

Using the channel ID as the sort key could result in recent channels database 112 having entries for each channel ID per profile ID. That is, multiple updates to the same channel IDs are collapsed into a single entry. However, the live service may have a limited number of channels that are offered on the service, such as 1000 channels. The limited number of channels means that the maximum number of possible entries per profile ID is the number of channels offered.

FIG. 4 depicts a simplified flowchart 400 of a method for using the channel ID as the sort key according to some embodiments. At 402, pre-calculator 110 receives a profile ID, a channel ID, and a timestamp for a channel change. At 404, pre-calculator 110 determines the channel ID as the sort key and the timestamp as the other data for an entry.

At 406, pre-calculator 110 sends a write command for the profile ID with the channel ID as the sort key and the timestamp as the other data to recent channels database 112. For example, the query may include the following parameters (profile ID, channel ID, timestamp ID). Accordingly, at 408, recent channels database 112 stores an entry (profile ID, channel ID, timestamp) in recent channels database 112. Using the channel ID as the sort key, multiple updates to the same channel are collapsed in a single entry. That is, if recent channels database 112 includes a pre-existing entry for the profile ID with the channel ID as the sort key, the channel ID is looked up and the timestamp for this entry is changed to the current timestamp that has been received. Recent channels database 112 does not add a new entry in recent channels database 112 in this case. If there is no pre-existing entry for the profile ID and the channel ID as the sort key, recent channels database 112 may create a new entry.

At 410, pre-calculator 110 may optionally perform removal of channel IDs. For example, different criteria may be used, such as pre-calculator 110 may remove channel IDs that have not been changed over a certain amount of time. Also, the removal may remove a number of channels, such as only X channels remain after the removal. For example, ten channels are saved while the rest of the channels are removed. The removal may reduce some storage that is being used but given the fixed number of channels per profile ID, and the fact that most profile IDs may not view all of or a large amount of the number of channels, the removal may not be needed.

Figure 5:
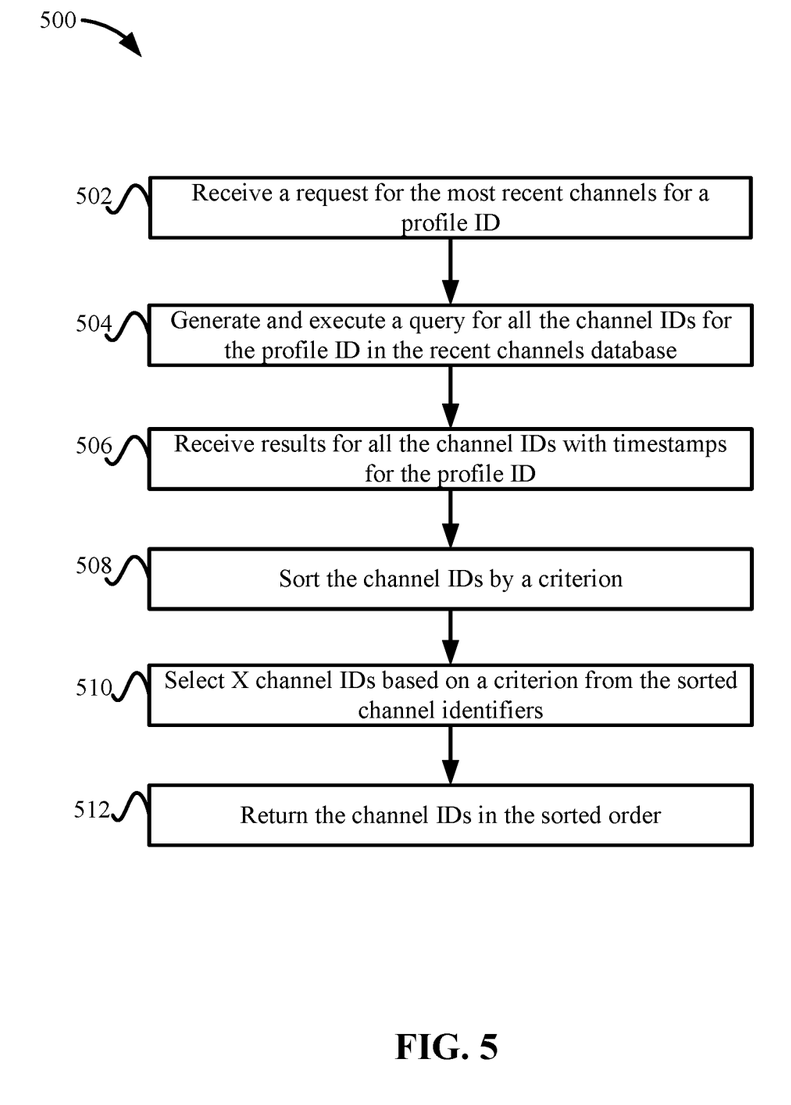
FIG. 5 depicts a simplified flowchart of a method for generating a list of recent channels according to some embodiments.

At some point, recent channels processor 114 may generate a list of recent channels for the profile ID. For example, recent channels processor 114 may want to display a list of recent channels on the interface being displayed at client 104 that is using the profile ID. For example, as the user interface is being browsed by a user, server system 102 may display a list of channels on a guide being displayed on the user interface. The list of channels may be displayed in other places also, such as in different views, pages, or portions of the user interface. The list of channels may provide the user with recent channels that may be more likely to be relevant to the user since the user has just watched these channels.

FIG. 5 depicts a simplified flowchart 500 of a method for generating a list of recent channels according to some embodiments. At 502, recent channels processor 114 receives a request for the most recent channels for a profile ID. The request may be based on the user interface being displayed at a client 104 that is associated with the profile ID. The request may also be generated from other sources, such as from other back-end services.

At 504, recent channels processor 114 generates and executes a query for channel IDs that are associated with the profile ID in recent channels database 112. For example, the query may request all the channel IDs that are stored in entries for the profile ID. In some embodiments, the query may use the shard key and the sort key to return entries that include the profile ID as the shard key, the channel ID as the sort key, and the timestamp as the other data. As discussed above, the maximum number of entries that are returned may be the number of the channel IDs for the live service. At 506, recent channels processor 114 receives the results for all the channel IDs with timestamps for the profile ID.

Because all the channel IDs have been received with associated timestamps, the entries may not be in the order required to answer the request for the most recent channels. In some embodiments, recent channels processor 114 may sort the channel IDs by a criterion. For example, recent channels processor 114 may sort the channel IDs by timestamp. At 508, recent channels processor 114 selects X channel IDs from the channel IDs based on the criterion. The number X may be the number of most recent channels that were requested. The criterion may be the most recent timestamps but may also be other criteria. For example, the criterion may be the most recent X channels within the last day.

At 510, recent channels processor 114 may return the channel IDs in the order. For example, the top ten most recent channels may be returned in the order of recency.

Using the Timestamp as the Sort Key

Figure 6:
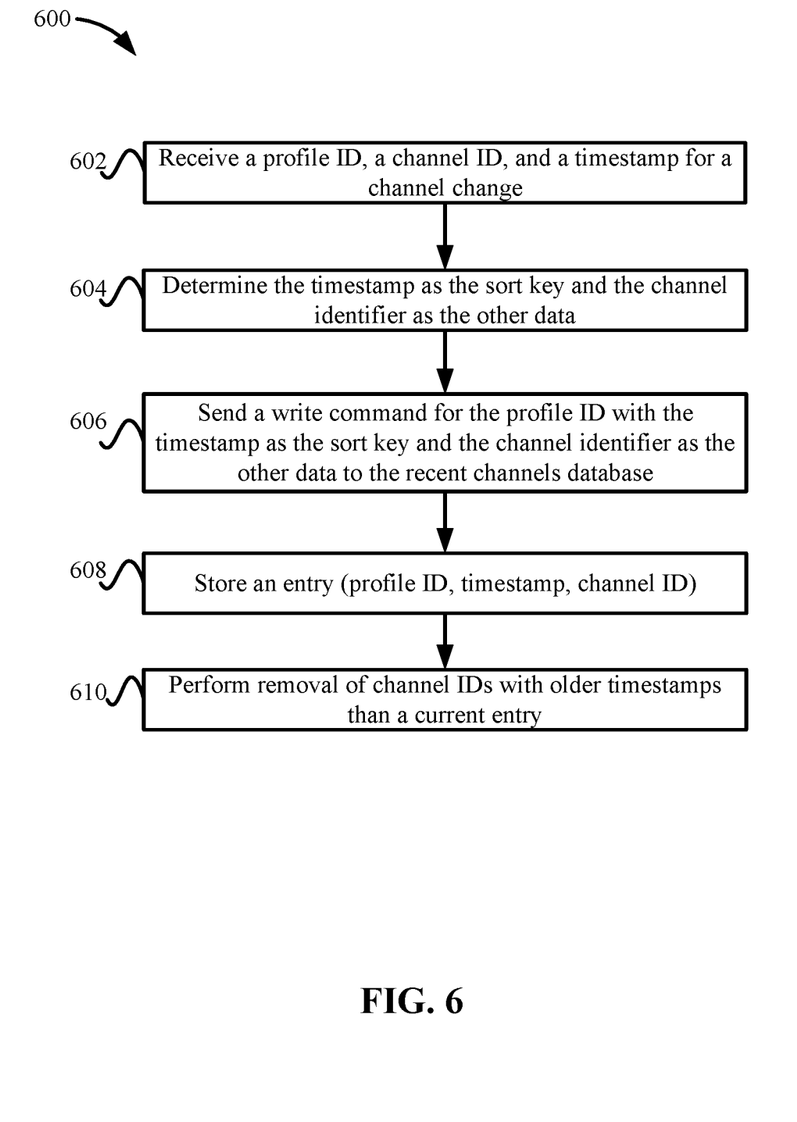
FIG. 6 depicts a simplified flowchart of a method for using the timestamp as the sort key according to some embodiments.

FIG. 6 depicts a simplified flowchart 600 of a method for using the timestamp as the sort key according to some embodiments. At 602, pre-calculator 110 receives a profile ID, a channel ID, and a timestamp for a channel change. At 604, pre-calculator 110 determines the timestamp as the sort key and the channel ID as the other data.

At 606, pre-calculator 110 sends a write command for the profile ID with the timestamp as the sort key and the channel ID as the other data to recent channels database 112. The write command may be of the form (profile ID, timestamp, channel ID). Thus, at 608, recent channels database 112 stores an entry of (profile ID, timestamp, channel ID) in recent channels database 112.

In some embodiments, if duplicate entries for the same channel ID are not desired, pre-calculator 110 may perform a read operation for the timestamp and the channel ID in association with the profile ID in recent channels database 112. Once identifying the entry, pre-calculator 110 can change the timestamp for the channel ID. In this case, duplicate entries may not be stored in recent channels database 112. However, if pre-calculator 110 does not determine previous entries with the same channel ID, but instead stores multiple entries for the channel ID, at 610, pre-calculator 110 may perform removal of channel IDs with older timestamps in a current entry. For example, at certain times, pre-calculator 110 may perform a clean-up of recent channels database 112. The clean-up may scan all the entries of recent channels database 112 and determine all entries for a specific channel ID. Then, pre-calculator 110 may delete the older timestamps for the channel ID while leaving the most current timestamp.

Figure 7:
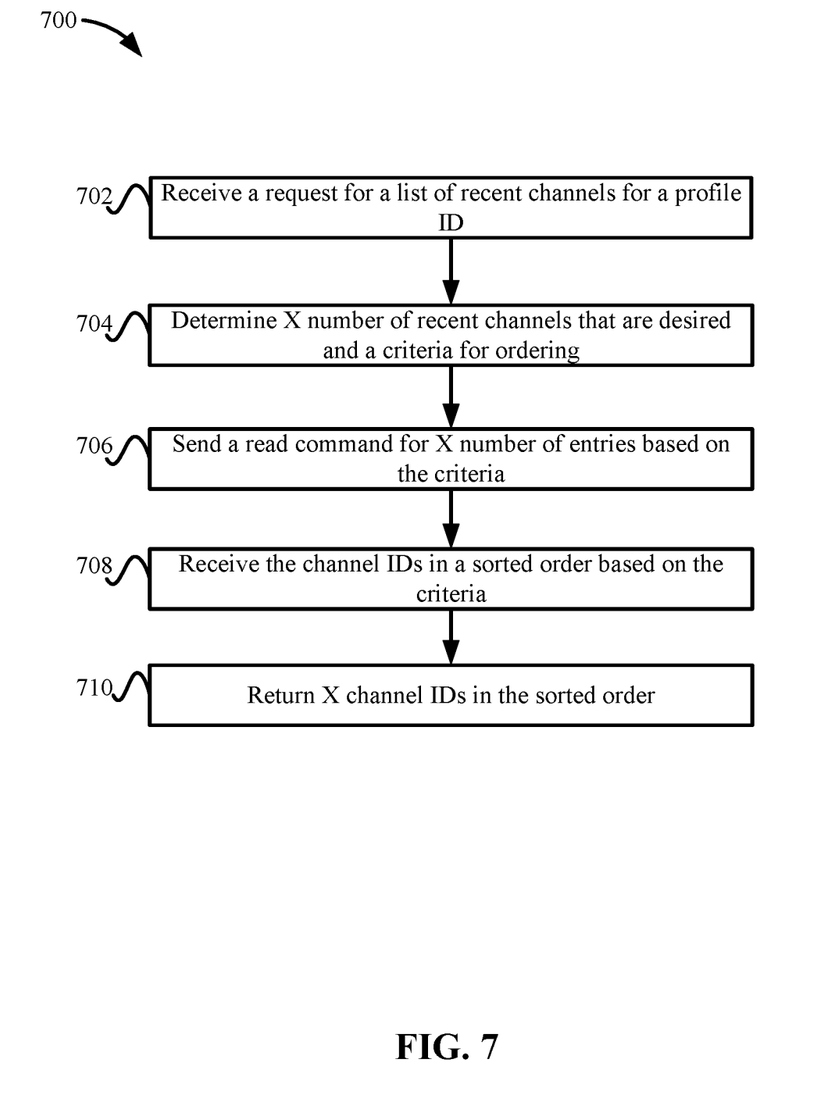
FIG. 7 depicts a simplified flowchart of a method for generating the list of recent channels using the timestamp as the sort key according to some embodiments.

When a query for a list of recent channels is received, recent channels processor 114 may be able to query for a list of the most recent channels in the desired order directly from recent channels database 112. For example, recent channels database 112 may store entries for a profile ID based on a timestamp as the sort key. Thus, recent channels processor 114 may be able to query using a criterion that specifies a time recency directly.

FIG. 7 depicts a simplified flowchart 700 of a method for generating the list of recent channels using the timestamp as the sort key according to some embodiments. At 702, recent channels processor 114 receives a request for a list of recent channels for a profile ID. At 704, recent channels processor 114 determines X number of recent channels that are desired based on a criterion. The number X may list the number of unique channels that are desired, and the criterion may specify the ordering, such as the most recent channel, or the number of channels within a time period.

At 706, recent channels processor 114 sends a read command for X number of entries based on the criterion. The read command may list a number for the X number of entries and the criterion, such as the top X most recent entries. In other embodiments, the read command may list a criterion, such as a time period, to determine the X number of entries.

At 708, recent channels processor 114 receives the channel IDs in an order based on the criteria. For example, if the criterion is X number of entries, then X channel IDs that have the most recent timestamps are received in order. Accordingly, recent channels processor 114 may not have to perform a sort operation. Further, recent channels processor 114 may receive only the entries requested, such as X entries, instead of all of the channel IDs for the profile that are stored in recent channels database 112 for the profile. However, in other embodiments, recent channels processor 114 may request all entries for a profile ID, which are received in a sorted order. If there are duplicate entries for a channel, recent channels processor 114 may delete the duplicates except for the newest entry. Then, recent channels processor 114 may select X number of entries in the sorted order. At 710, recent channels processor 114 returns X channel IDs in the sorted order.

Conclusion

Accordingly, some embodiments perform a pre-calculation of information included in view progress beacons that list assets being currently watched by clients 104. Pre-calculation may look up channel IDs for the assets. Further pre-calculations may be performed to determine if the view progress beacon is associated with a channel change for the profile ID. Additionally, pre-calculator 110 may store entries in recent channels database 112 in different ways to read recent channels database 112 to determine the list of recent channels.

Example Embodiments

In some embodiments, a method comprising: receiving, by a computing device, a message that identifies an asset being viewed on a video service at a timestamp, wherein the message is associated with a profile identifier and a plurality of messages are received for the profile identifier while using the video service; determining, by the computing device, a channel identifier for a channel in which the asset is offered during the timestamp; determining, by the computing device, whether a channel change occurred based on the channel identifier and a prior channel identifier determined from a prior message in the plurality of messages; when the channel change has occurred, storing, by the computing device, the channel identifier and timestamp for the profile identifier in a data structure, wherein a list of channels is generated by querying the data structure to determine a set of channel identifiers and timestamps for the profile identifier.

In some embodiments, determining whether the channel change occurred comprises: comparing the channel identifier to the prior channel identifier to determine whether the channel identifier to the prior channel identifier are a same value.

In some embodiments, the method further comprising: when the channel change has not occurred, not storing the channel identifier and the timestamp for the profile identifier in the data structure for the message.

In some embodiments, the method further comprising: when the channel change has not occurred, not storing the channel identifier and the timestamp for the profile identifier in the data structure for the message.

In some embodiments, the data structure comprises a first data structure, the method further comprising: when the channel change has occurred, storing the channel identifier for the profile identifier in a second data structure, wherein the second data structure stores a most recent channel for the profile identifier; and when the channel change has not occurred, not storing the channel identifier in the second data structure for the profile identifier.

In some embodiments, the plurality of messages are sent at intervals regardless of whether a channel change occurs for the profile identifier.

In some embodiments, storing the channel identifier and the timestamp for the profile identifier in the data structure comprises storing the channel identifier instead of the asset identifier that is received in the message.

In some embodiments, storing the channel identifier and the timestamp for the profile identifier in the data structure comprises: storing an entry in the data structure for the profile identifier with the channel identifier as a sort key and the timestamp as information for the sort key, wherein the sort key is usable to sort entries in the data structure.

In some embodiments, the method further comprising: retrieving a set of entries for channel identifiers that are associated with the profile identifier in the data structure.

In some embodiments, the method further comprising: sorting the set of entries by respective timestamps that are associated with the channel identifiers to determine the list of channels.

In some embodiments, all entries associated with the profile identifier in the data structure are retrieved and the list of channels includes a portion of the entries.

In some embodiments, the data structure includes a single entry for each respective channel identifier that is stored for the profile identifier.

In some embodiments, storing the channel identifier and the timestamp for the profile identifier in the data structure comprises: storing an entry in the data structure for the profile identifier with the timestamp as a sort key and the channel identifier as information for the sort key, wherein the sort key is usable to sort entries in the data structure.

In some embodiments, the method further comprising: retrieving a set of entries for timestamps that are associated with the profile identifier in the data structure.

In some embodiments, the set of entries are sorted by time based on respective timestamps that are associated with the channel identifiers.

In some embodiments, a portion of entries associated with the profile identifier in the data structure are retrieved based on a criterion.

In some embodiments, the data structure includes multiple entries for a channel identifier that is stored for the profile identifier.

In some embodiments, a non-transitory computer-readable storage medium containing instructions, that when executed, control a computer system to be operable for: receiving a message that identifies an asset being viewed on a video service at a timestamp, wherein the message is associated with a profile identifier and a plurality of messages are received for the profile identifier while using the video service; determining a channel identifier for a channel in which the asset is offered during the timestamp; determining whether a channel change occurred based on the channel identifier and a prior channel identifier determined from a prior message in the plurality of messages; when the channel change has occurred, storing the channel identifier and timestamp for the profile identifier in a data structure, wherein a list of channels is generated by querying the data structure to determine a set of channel identifiers and timestamps for the profile identifier.

In some embodiments, the data structure comprises a first data structure, the method further comprising: when the channel change has occurred, storing the channel identifier for the profile identifier in a second data structure, wherein the second data structure stores a most recent channel for the profile identifier; and when the channel change has not occurred, not storing the channel identifier in the second data structure for the profile identifier.

In some embodiments, storing the channel identifier and the timestamp for the profile identifier in the data structure comprises: storing an entry in the data structure for the profile identifier with the channel identifier as a sort key and the timestamp as information for the sort key, wherein the sort key is usable to sort entries in the data structure.

In some embodiments, an apparatus comprising: one or more computer processors; and a non-transitory computer-readable storage medium comprising instructions, that when executed, control the one or more computer processors to be operable for: receiving a message that identifies an asset being viewed on a video service at a timestamp, wherein the message is associated with a profile identifier and a plurality of messages are received for the profile identifier while using the video service; determining a channel identifier for a channel in which the asset is offered during the timestamp; determining whether a channel change occurred based on the channel identifier and a prior channel identifier determined from a prior message in the plurality of messages; when the channel change has occurred, storing the channel identifier and timestamp for the profile identifier in a data structure, wherein a list of channels is generated by querying the data structure to determine a set of channel identifiers and timestamps for the profile identifier.

System

Figure 8:
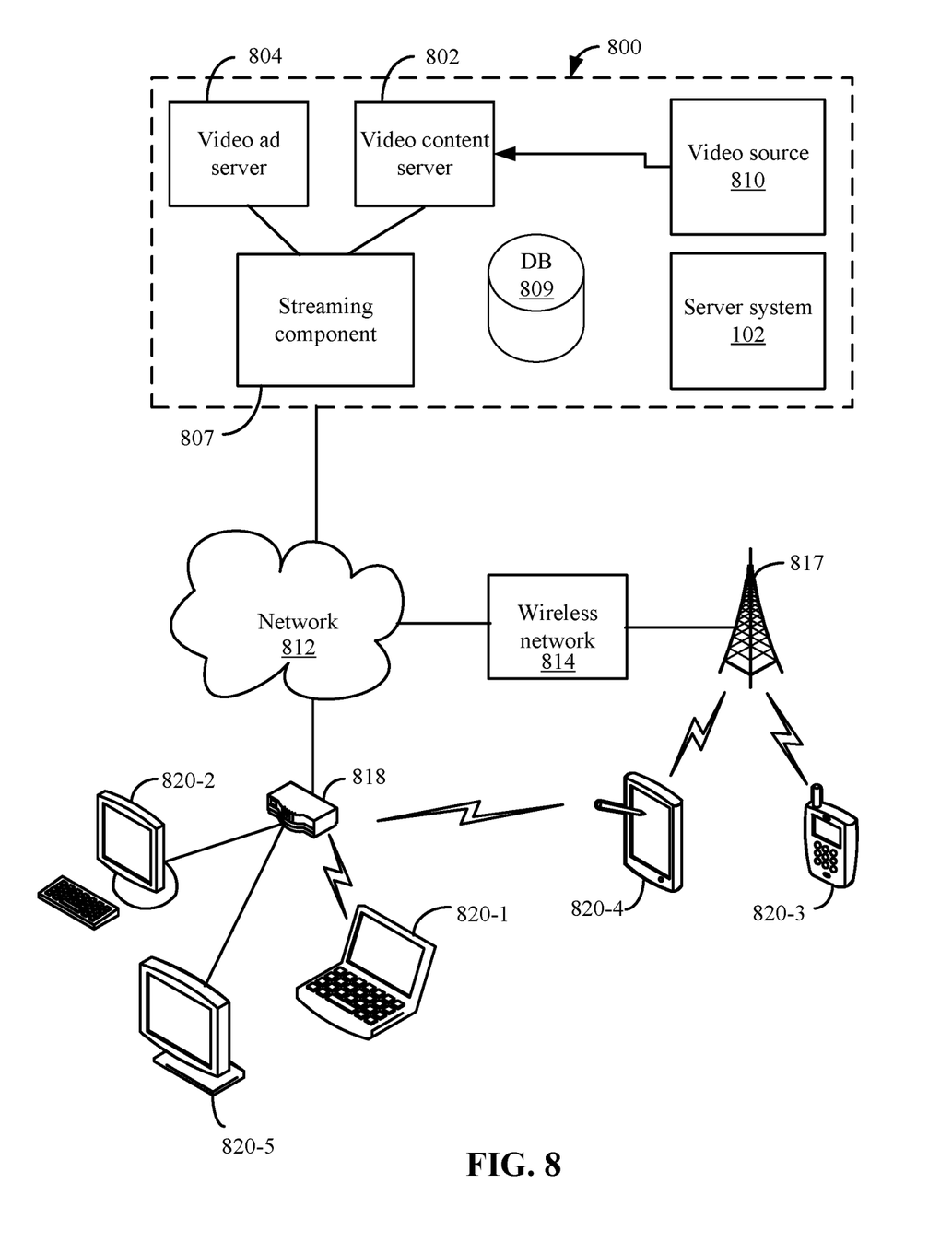
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 also may include server system 102.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
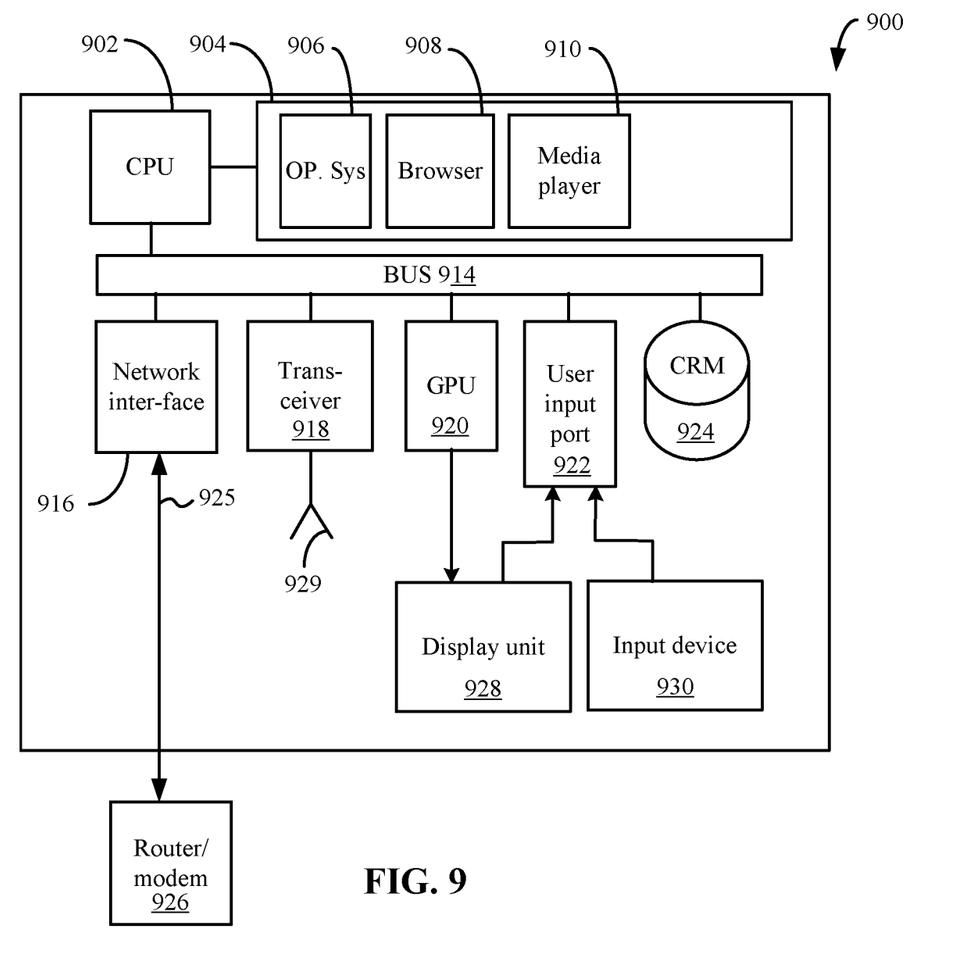
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device, a message that identifies an asset identifier for an asset being viewed on a video service at a timestamp, wherein the message is associated with a profile identifier and a plurality of messages are received for the profile identifier while using the video service;

looking up, by the computing device, information for the asset identifier to determine whether the asset is associated with a first type of service or a second type of service, wherein an asset for the first type of service is being viewed on a channel and an asset for the second type of service is not being viewed on a channel, and wherein the plurality of messages for the profile identifier include asset identifiers for the first type of service and the second type of service;

if the asset identifier is associated with the first type of service, performing:

looking up, by the computing device, a channel identifier using the asset identifier, wherein the channel identifier is for a channel in which the asset is offered during the timestamp;

determining, by the computing device, whether a channel change from a prior channel identifier to the channel identifier occurred for the profile, wherein the prior channel identifier is determined based on a prior message in the plurality of messages; and when the channel change has occurred, storing, by the computing device, the channel identifier and timestamp for the profile identifier in a data structure, wherein a list of channels is generated by querying the data structure to determine a set of channel identifiers and timestamps for the profile identifier;

if the asset identifier is associated with the second type of service, bypassing, by the computing device, looking up a channel identifier, determining whether

17 the channel change occurred, and storing the channel identifier, wherein the list of channels does not include information from messages that identify the asset identifier is associated with the second type of service; and waiting, by the computing device, for another message with another asset identifier to determine whether another asset identifier is associated with the first type of service.

2. The method of claim 1, wherein determining whether the channel change occurred comprises:

comparing the channel identifier to the prior channel identifier to determine whether the channel identifier and the prior channel identifier are a same value.

3. The method of claim 1, further comprising:

when the channel change has not occurred, not storing the channel identifier and the timestamp for the profile identifier in the data structure for the message.

4. The method of claim 1, wherein the data structure comprises a first data structure, the method further comprising:

when the channel change has occurred, storing the channel identifier for the profile identifier in a second data structure, wherein the second data structure stores a most recent channel for the profile identifier; and when the channel change has not occurred, not storing the channel identifier in the second data structure for the profile identifier.

5. The method of claim 1, wherein the plurality of messages are sent at intervals regardless of whether a channel change occurs for the profile identifier.

6. The method of claim 1, wherein storing the channel identifier and the timestamp for the profile identifier in the data structure comprises storing the channel identifier instead of an asset identifier for the asset that is received in the message.

7. The method of claim 1, wherein storing the channel identifier and the timestamp for the profile identifier in the data structure comprises:

storing an entry in the data structure for the profile identifier with the channel identifier as a sort key and the timestamp as information for the sort key, wherein the sort key is usable to sort entries in the data structure.

8. The method of claim 7, further comprising:

retrieving a set of entries for channel identifiers that are associated with the profile identifier in the data structure.

9. The method of claim 8, further comprising:

sorting the set of entries by respective timestamps that are associated with the channel identifiers to determine the list of channels.

10. The method of claim 8, wherein all entries associated with the profile identifier in the data structure are retrieved and the list of channels includes a portion of the entries.

11. The method of claim 7, wherein the data structure includes a single entry for each respective channel identifier that is stored for the profile identifier.

12. The method of claim 1, wherein storing the channel identifier and the timestamp for the profile identifier in the data structure comprises:

storing an entry in the data structure for the profile identifier with the timestamp as a sort key and the channel identifier as information for the sort key, wherein the sort key is usable to sort entries in the data structure.

18

13. The method of claim 1, further comprising:

retrieving a set of entries for timestamps that are associated with the profile identifier in the data structure.

14. The method of claim 13, wherein the set of entries are sorted by time based on respective timestamps that are associated with the channel identifiers.

15. The method of claim 13, wherein a portion of entries associated with the profile identifier in the data structure are retrieved based on a criterion.

16. The method of claim 13, wherein the data structure includes multiple entries for a channel identifier that is stored for the profile identifier.

17. The method of claim 1, wherein messages associated with the first type of service and the second type of service include an asset identifier and not a channel identifier.

18. The method of claim 1, wherein:

the first type of service comprises a live television service that offers the asset for viewing on the channel, and the second type of service comprises on-demand service that does not offer the asset for viewing on the channel.

19. A non-transitory computer-readable storage medium containing instructions, that when executed, control a computer system to be operable for:

receiving a message that identifies an asset identifier for an asset being viewed on a video service at a timestamp, wherein the message is associated with a profile identifier and a plurality of messages are received for the profile identifier while using the video service;

looking up information for the asset identifier to determine whether the asset is associated with a first type of service or a second type of service, wherein an asset for the first type of service is being viewed on a channel and an asset for the second type of service is not being viewed on a channel, and wherein the plurality of messages for the profile identifier include asset identifiers for the first type of service and the second type of service;

if the asset identifier is associated with the first type of service, performing:

looking up a channel identifier using the asset identifier, wherein the channel identifier is for a channel in which the asset is offered during the timestamp;

determining whether a channel change from a prior channel identifier to the channel identifier occurred for the profile, wherein the prior channel identifier is determined based on a prior message in the plurality of messages; and when the channel change has occurred, storing the channel identifier and timestamp for the profile identifier in a data structure, wherein a list of channels is generated by querying the data structure to determine a set of channel identifiers and timestamps for the profile identifier;

if the asset identifier is associated with the second type of service, bypassing looking up a channel identifier, determining whether the channel change occurred, and storing the channel identifier, wherein the list of channels does not include information from messages that identify the asset identifier is associated with the second type of service; and waiting for another message with another asset identifier to determine whether another asset identifier is associated with the first type of service.

20. The non-transitory computer-readable storage medium of claim 19, wherein the data structure comprises a first data structure, further configured for:

when the channel change has occurred, storing the channel identifier for the profile identifier in a second data structure, wherein the second data structure stores a most recent channel for the profile identifier; and when the channel change has not occurred, not storing the channel identifier in the second data structure for the profile identifier.

21. The non-transitory computer-readable storage medium of claim 19, wherein storing the channel identifier and the timestamp for the profile identifier in the data structure comprises:

storing an entry in the data structure for the profile identifier with the channel identifier as a sort key and the timestamp as information for the sort key, wherein the sort key is usable to sort entries in the data structure.

22. An apparatus comprising:

one or more computer processors; and a non-transitory computer-readable storage medium comprising instructions, that when executed, control the one or more computer processors to be operable for:

receiving a message that identifies an asset identifier for an asset being viewed on a video service at a timestamp, wherein the message is associated with a profile identifier and a plurality of messages are received for the profile identifier while using the video service;

looking up information for the asset identifier to determine whether the asset is associated with a first type of service or a second type of service, wherein an asset for the first type of service is being viewed on a channel and an asset for the second type of service is not being viewed on a channel, and wherein the plurality of messages for the profile identifier include asset identifiers for the first type of service and the second type of service;

if the asset identifier is associated with the first type of service, performing:

looking up a channel identifier using the asset identifier, wherein the channel identifier is for a channel in which the asset is offered during the timestamp;

determining whether a channel change from a prior channel identifier to the channel identifier occurred for the profile, wherein the prior channel identifier is determined based on a prior message in the plurality of messages; and when the channel change has occurred, storing the channel identifier and timestamp for the profile identifier in a data structure, wherein a list of channels is generated by querying the data structure to determine a set of channel identifiers and timestamps for the profile identifier;

if the asset identifier is associated with the second type of service, bypassing looking up a channel identifier, determining whether the channel change occurred, and storing the channel identifier, wherein the list of channels does not include information from messages that identify the asset identifier is associated with the second type of service; and waiting for another message with another asset identifier to determine whether another asset identifier is associated with the first type of service.

* * * * *